United States Patent [19]

Takaku

[11] Patent Number: 4,966,512
[45] Date of Patent: Oct. 30, 1990

[54] INTERCONNECTING CONSTRUCTION BETWEEN MOUNTING PLATE AND BOLT

[75] Inventor: Hitoshi Takaku, Saitama, Japan

[73] Assignee: Jidosha Kiki Co., Ltd., Tokyo, Japan

[21] Appl. No.: 282,743

[22] Filed: Dec. 9, 1988

[30] Foreign Application Priority Data

Dec. 15, 1987 [JP] Japan .................. 62-316718

[51] Int. Cl.⁵ ............................................ F16B 37/04
[52] U.S. Cl. .................................. 411/181; 411/176;
411/362; 411/399; 411/424; 411/501; 411/508;
411/967; 29/509
[58] Field of Search ............... 411/166, 171, 362, 450,
411/501, 508, 967, 176, 399, 378, 411, 424, 181;
60/547.1; 29/509

[56] References Cited

U.S. PATENT DOCUMENTS

| | | | |
|---|---|---|---|
| 1,960,734 | 5/1934 | Fassinger | 411/424 |
| 1,968,516 | 7/1934 | Dieter | 411/399 |
| 1,969,796 | 8/1934 | Hoke | 411/336 |
| 2,170,472 | 8/1939 | Fitch | 411/176 X |
| 3,367,685 | 2/1968 | Church et al. | 411/967 X |
| 3,535,678 | 10/1970 | Gulistan | 411/967 X |
| 4,114,670 | 9/1978 | Akashi et al. | 411/967 X |
| 4,357,746 | 11/1982 | Kytta | 29/509 |
| 4,466,246 | 8/1984 | Furuta et al. | 60/547.1 |
| 4,583,366 | 4/1986 | Tsubouchi et al. | 60/547.1 |
| 4,598,548 | 7/1986 | Wagner | 60/547.1 |
| 4,689,958 | 9/1987 | Arino et al. | |
| 4,726,189 | 2/1988 | Arino et al. | |
| 4,820,076 | 4/1989 | Rossigno | 29/509 X |

FOREIGN PATENT DOCUMENTS 31266 9/1977 Japan .

Primary Examiner—Gary L. Smith
Assistant Examiner—Jerry Redman
Attorney, Agent, or Firm—Flynn, Thiel, Boutell & Tanis

[57] ABSTRACT

In interconnecting construction between a bolt and a mounting plate such as a shell of a brake booster is disclosed. A sealing, annular projection is formed in an end face of a bolt head so as to surround a bolt shank which is formed with a serration. Both the annular projection and the serration are caused to bite into the opposite surfaces of the mounting plate, whereby an excellent sealing effect and locking action against rotation are simultaneously achieved.

7 Claims, 1 Drawing Sheet

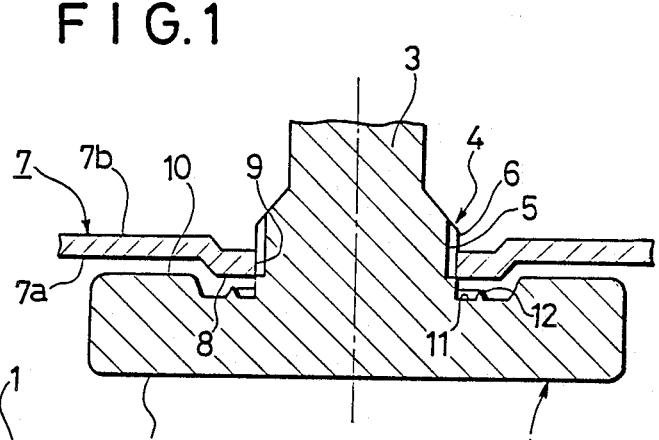
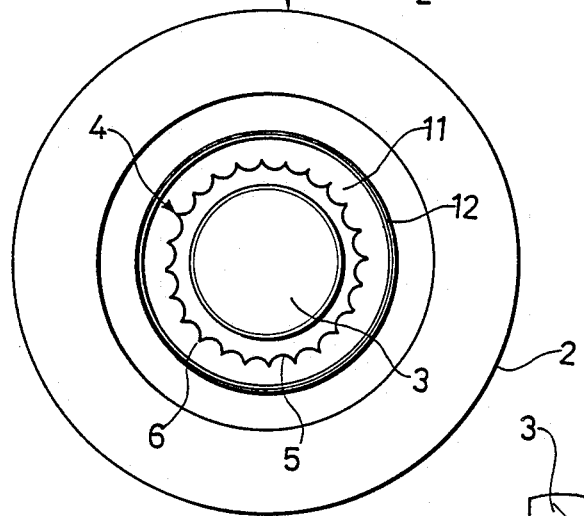
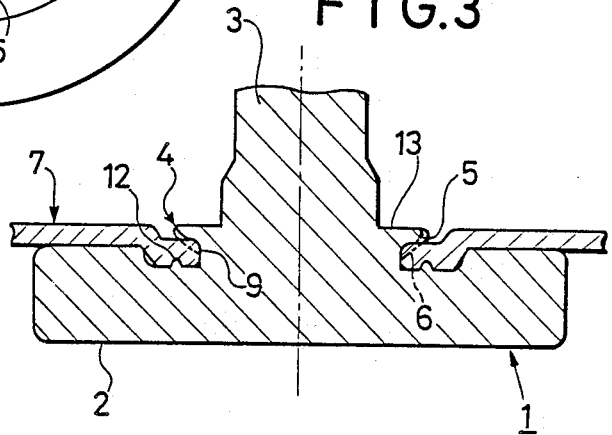

INTERCONNECTING CONSTRUCTION BETWEEN MOUNTING PLATE AND BOLT

FIELD OF THE INVENTION

The invention relates to an interconnecting construction between a mounting plate which may be associated with a shell of a brake booster and a bolt, and more particularly, to such an interconnecting construction in which a bolt is connected to a mounting plate in a hermetically sealed manner and in a non-rotatable manner with respect thereto as by caulking.

DESCRIPTION OF THE PRIOR ART

In a conventional brake booster, shanks of bolts extend through a front shell and a rear shell, respectively, from their inside to the outside thereof, and each bolt is secured to the respective shell by a caulking operation. A bolt mounted on the rear shell is utilized to mount a brake booster on a car body while a bolt mounted on the front shell is used to mount a master cylinder on the brake booster.

An interconnecting construction which connects a bolt with a mounting plate associated with a shell or the like by a caulking operation is previously proposed (see Japanese Laid-Open Patent Application No. 31,266/1977) where a bolt shank is formed with a serration at its one end which is a press fit into an opening formed in a mounting plate so that the serration bites into the mounting plate. An end face of the bolt head is disposed in abutment against one side of the mounting plate while the serration is subjected to a plastic deformation from the other side of the mounting plate, thereby allowing the combination of the plastic deformation and the end face of the bolt head to secure the bolt to the mounting plate in a sandwiched manner.

In the disclosed construction, when the serration bites into the mounting plate, the bolt is no longer able to rotate relative to the mounting plate. A clearance between the bolt and the mounting plate is sealed by a contact between the mounting plate and a region of the bolt extending from the end face of the bolt to the plastic deformation, in particular, by a tight contact between the surfaces of the serration and the opening formed in the mounting plate.

It is to be noted however that in the disclosed construction, an increase in the height between the peak and valley of the serration which would increase the ability to lock the bolt against rotation relative to the mounting plate will result in a degraded sealing effect while a reduction in the height to improve the sealing effect results in a degraded locking action against rotation. Thus, the achievement of an excellent sealing effect and locking action are conflicting to each other, and if a design is attempted which simultaneously achieves a degree of sealing effect and locking action, a failure of hermetic seal may result due to an aberration which may occur in the caulking condition.

SUMMARY OF THE INVENTION

In view of the foregoing, in an interconnecting construction between a mounting plate and a bolt in which a bolt shank is formed with a serration at its one end which extends into an opening formed in the mounting plate while an end face of a bolt head is disposed in abutment against one side of the mounting plate and the serration is subjected to a plastic deformation from the other side of the mounting plate so that the bolt is secured to the mounting plate in a sandwiched manner between the plastic deformation and the end face of the bolt head while causing the serration to bite into the mounting plate, in accordance with the invention, there is proposed an arrangement in which a sealing, annular projection is formed on the end face of the bolt head so as to surround the bolt shank, and both the annular projection and the serration are caused to bite into the mounting plate.

In the described construction, a reliable sealing effect is accomplished by means of the annular projection, which allows the height between the peak and valley of the serration to be increased to improve the ability to lock against rotation.

Above and other objects and advantages of the invention will become apparent from the following description of an embodiment thereof with reference to the attached drawings.

BRIEF DESCRIPTION OF THE DRAWINGS

FIG. 1 is a section of one embodiment of the invention before a caulking operation takes place;

FIG. 2 is a plan view of a bolt 1; and

FIG. 3 is a section of the embodiment shown in FIG. 1 after it has been caulked.

DETAILED DESCRIPTION OF EMBODIMENT

Referring to the drawings, an embodiment of the invention will be described. As shown in FIG. 1, a bolt 1 includes a bolt head 2 and a bolt shank 3, and the latter is formed with a serration 4 of an increased diameter at the junction with the bolt head 2. As shown in FIG. 2, the serration 4 comprises a plurality of axially extending grooves 5 which are U-shaped in section, and cusps 6 defined between the adjacent grooves 5.

A mounting plate 7 such as a shell of a brake booster, for example, to which the bolt 1 is to be connected is formed with a frustoconical depression (or raised portion) 8, which is centrally formed with an opening 9 extending therethrough. The bolt shank 3 including the serration 4 is then passed into the opening 9 from the bottom side of the depression 8, which is then received in an annular recess 11 formed in an end face 10 of the bolt head 2. A sealing, annular projection 12 is formed in the annular recess 11 so as to surround the bolt shank 3.

The depth of the depression 8 is chosen to be substantially equal to the depth of the annular recess 11 so that the bottom surface of the depression 8 abuts against the bottom surface of the annular recess 11 at the same time as the lower surface 7a of the mounting plate 7 abuts against the end face 10 of the bolt head.

When caulking the bolt 1 to the mounting plate 7, the bolt shank 3 including the serration 4 is passed into the opening 9 from the bottom side of the depression 8 and the depression 8 is disposed so as to be received within the annular recess 11. Then, a fixture, not shown, is applied to the upper surface 7b of the mounting plate 7 to cause a plastic deformation of the serration 4.

Thereupon, the mounting plate 7 is held sandwiched between a region 13 of the bolt shank which has been subjected to a plastic deformation and the end face 10 of the bolt head 2, whereby the bolt 1 is secured to the mounting plate. Under this condition, the cusps 6 of the serration 4 bite into the upper surface 7b of the mounting plate around the opening 9, and the annular projection 12 bites into the lower surface 7a of the mounting plate 7. When the bolt 1 is caulked to the mounting plate 7 in the manner mentioned above, the biting action of the annular projection 12 into the lower surface 7a of the mounting plate 7 assures a reliable sealing effect in such region, without any substantial influence of any aberration in the caulking condition. Since the reliable sealing effect is achieved by the annular projection 12, it is no longer necessary to choose a relatively small value for the height of the cusps 6 in the serration 4, thus allowing an increased height to be chosen for the cusps 6 to achieve a reliable locking action of the bolt 1 against rotation.

In the above embodiment, the frustoconical depression 8 is formed in the mounting plate 7 in combination with the annular recess 11 formed in the end face 10 of the bolt head, but their provision is not essential.

While the invention has been described above in connection with an embodiment thereof, it should be understood that a number of changes, modifications and substitutions therein will readily occur to one skilled in the art without departing from the spirit and scope of the invention defined by the appended claims.

What is claimed is:

1. An interconnecting construction between a mounting plate and a bolt in which a bolt shank is formed with a serration having several cusps at its one end, which serration is passed through an opening formed in a mounting plate, and an end face of a bolt head is disposed in abutment against one side of the mounting plate while the serration is subjected to a plastic deformation from the other side of the mounting plate, the mounting plate is held sandwiched between a portion of the bolt shank which passes through the opening and is subjected to the plastic deformation and the end face of the bolt head so as to secure the bolt to the mounting plate, with the serration biting into the mounting plate; characterized by a sealing, annular projection formed in the end face of the bolt head so as to surround the bolt shank, the annular projection and the serration being caused to bite into the mounting plate, and an annular recess formed in the end face of the bolt head, said annular projection being located in said annular recess.

2. An interconnecting construction according to claim 1 in which the mounting plate is formed with a raised portion on its side facing the annular recess and having a height which is substantially equal to the depth of the annular recess.

3. An interconnecting construction according to claim 1 in which the bolt shank has an increased diameter at its one end where the serration is formed.

4. An interconnecting construction according to claim 1 in which the mounting plate comprises a shell of a brake booster.

5. An interconnecting construction according to claim 1, wherein said end face of said bolt head and said mounting plate contact each other in the region of said annular projection along respective distinct but snugly abutting contact surfaces to form a seal.

6. An interconnecting construction according to claim 2, wherein said raised portion has an annular structure and is received in said annular recess, said annular projection having a height which is less than the depth of said annular recess.

7. An interconnecting construction according to claim 6, wherein said bolt defines a central, longitudinal axis, and said annular projection bites into said raised portion of said mounting plate, wherein the deformed portion of said bolt shank has a part which extends radially outwardly from said bolt shank, axially abuts said raised portion of said mounting plate, and terminates in a radially outer edge, said radially outer edge and said annular projection being substantially equidistant from the central axis of said bolt, wherein said mounting plate and said radially outwardly extending part of said deformed portion have respective surfaces which face axially opposite said bolt head and are substantially co-planar with one another, wherein said serration defines a radially inner edge of said annular recess, said annular projection being spaced radially outwardly from said inner edge by an amount approximately equal to a thickness of said radially outwardly extending part of said deformed portion, said annular projection being substantially radially centrally located in said annular recess, wherein said deformed portion includes a radially outwardly facing surface adjoining said axially facing surface of said radially outwardly extending part, said radially inner edge of said annular recess being located substantially midway radially between said radially outwardly facing surface and said radially outer edge of said deformed portion, and wherein said end face of said bolt head and said mounting plate contact each other in the region of said annular projection along respective distinct but snugly abutting contact surfaces to form a seal.

* * * * *